Jan. 19, 1971  YASUO OHTSU  3,555,647
PINNED THROWAWAY INSERT AND HOLDER THEREFOR WITH
MULTIPLE SURFACE RESTRICTIONS
Filed Sept. 17, 1968  4 Sheets-Sheet 1
FIG. 1
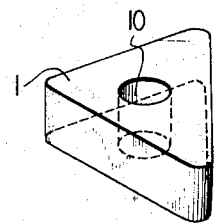
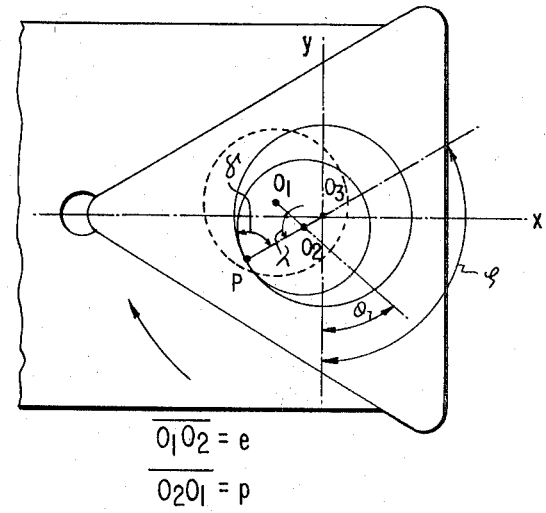
$\overline{O_1 O_2} = e$
$\overline{O_2 O_1} = p$
FIG. 9
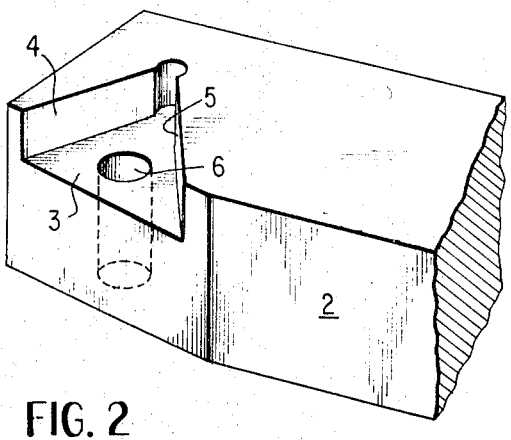
FIG. 2
FIG. 10
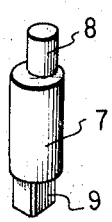
FIG. 3
INVENTOR
YASUO OHTSU
BY *Sughrue, Rothwell, Mion, Zinn & Macpeak*
ATTORNEYS.

FIG. 4A
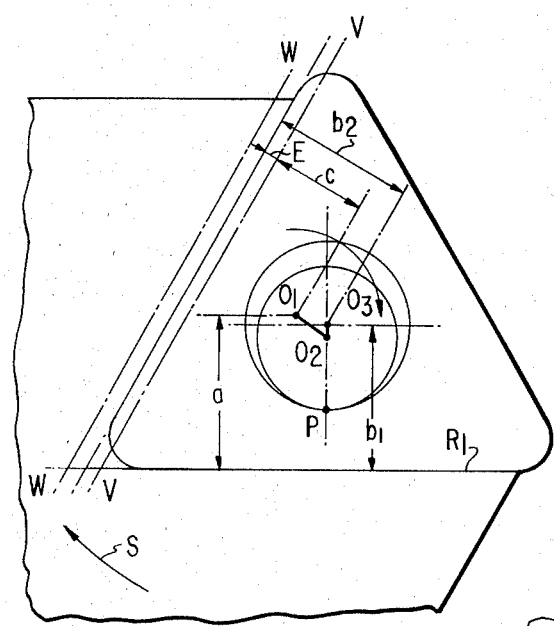
FIG. 4B
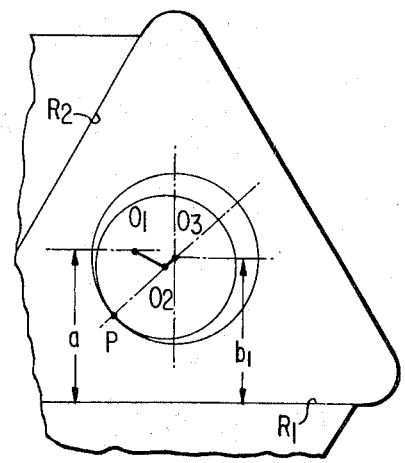
FIG. 4C
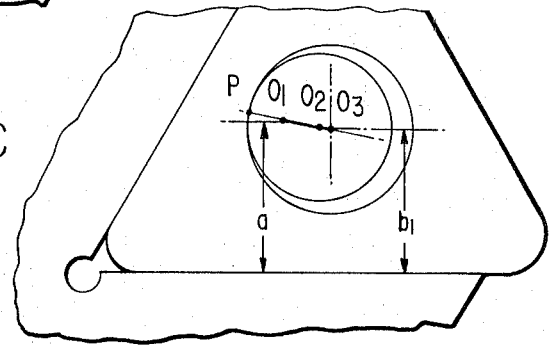
FIG. 5A
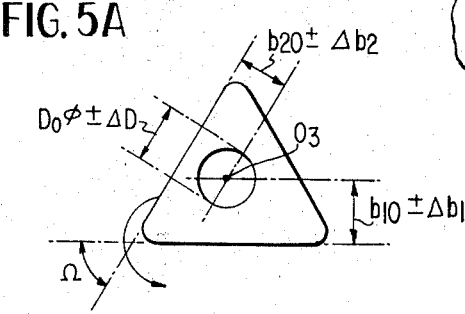
FIG. 5B
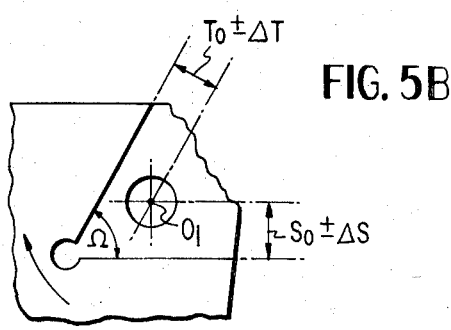
FIG. 5C
FIG. 5D
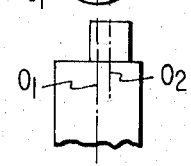

INVENTOR
YASUO OHTSU

ATTORNEYS.

United States Patent Office 3,555,647
Patented Jan. 19, 1971

3,555,647
PINNED THROWAWAY INSERT AND HOLDER THEREFOR WITH MULTIPLE SURFACE RESTRICTIONS
Yasuo Ohtsu, Itami-shi, Japan, assignor to Sumitomo Electric Industries, Ltd., Osaka, Japan
Filed Sept. 17, 1968, Ser. No. 760,330
Claims priority, application Japan, Sept. 17, 1967, 42/59,507
Int. Cl. B23p *19/00*
U.S. Cl. 29—200  2 Claims

ABSTRACT OF THE DISCLOSURE

A throwaway insert provided with a hole, and a recesed holder for receiving the same which employs an eccentrically rotatable pin portion positioned within the hole carried by the throwaway insert allowing the insert to be clamped to the holder by rotating the eccentric pin portion while employing two restricting surfaces to properly locate the insert with respect to the holder recess.

BACKGROUND OF THE INVENTION

Field of the invention

This invention relates to holders for supporting a throwaway insert within the surface recess and in particular to the importance of a pin rotatable in the cylindrical hole carried by the recessed portion of the holder to properly locate the insert which receives a second eccentric portion of the pin.

Description of the prior art

Various devices carry surface recesses which act to support a throwaway insert of a configuration corresponding to the recess and in which, pins or the like extending from the holder are received in openings carried by the insert. Various types of structural arrangements have been employed for maintaining the insert clamped to the recessed holder.

In one arrangement, the recessed portion of the holder is provided with a restricting surface other than the base surface for preventing movement of a side face of the insert. The insert is then pressed against the surface of the holder by rotating an eccentric pin which is mounted within a cylindrical hole which extends from the recessed portion of the holder inwardly, away from the insert.

A second method of insert clamping to a recess involves the provision of two restricting surfaces at the recessed portion of the holder. In this case, an eccentric pin is not used for fixing the insert to the recessed holder. A portion of the attaching pin is engaged with the hole formed in the holder to form a pivot and the insert is pressed onto the attaching portion which extends from the holder while the insert is in surface contact with the two restricting surfaces which form the holder recess. Attachment utilizes only the leverage of the attaching pin.

In yet another method of attachment, an insert of special shape or configuration is used. The insert is again pressed into the recess with its surfaces in contact with the two restricting surfaces of the holder. In this case the holder utilizes a pin mounted for eccentric rotation but it is necessary to employ an insert having a hole of special shape so that a uniform force is exerted by the insert on the two restricting surfaces of the holder.

In another conventional attachment technique, a cylindrical pin is fixed to the holder and restricting surfaces are provided on a movable, wedged type part which contacts the insert to clamp the same to the holder.

Considering all four prior art methods of attaching throwaway inserts to a recessed holder, it is noted that in the conventional arrangements, the attaching pin is provided in two types, one employing an eccentric position with respect to the hole carried by the insert, and the other of which is where the attachment pin is concentric to the insert hole. Where the eccentric construction is used, the insert is clamped fast to the holder and tightly fixed to the same and the arrangement is extremely low in cost.

On the other hand, attachment techniques which do not have eccentric pin construction, have disadvantages such as requiring special construction, a relatively large base for mounting and removing the insert and increased cost in the production thereof.

The number of restricting surfaces at the recessed portion of the holder for receiving the insert, that is, the surfaces of the holder recess which restrict the side surfaces of the throwaway insert may not be necessarily two, but may be one. However, for accuracy for holding the insert within the recess, it is desirable to have two restricting or locating surfaces.

Heretofore, in the structure utilizing the eccentrically mounted pin, only one restricting surface is employed, since the restriction of the insert at two restricting surfaces is difficult when employing this type of eccentric pin coupling. In the case where a single restricting surface is provided, though it is sufficient to maintain the position of the insert within the holder for a cutting load in one direction, the connection is extremely weak for loading of the insert in other directions and there exists the possibility of breaking the insert. There is a further disadvantage in the case where a single restricting surface is employed since the position of the insert may be varied by the variation of cutting load during the cutting process or by changing of the insert itself when the cutting dimension is varied.

It is therefore an object of the present invention to provide an insert holder which restricts movement of the insert through the employment of two restricting surfaces while employing an eccentric pin connection and an insert having a pin receiving hole of the usual configuration.

SUMMARY OF THE INVENTION

The present invention is directed to a holder for supporting a throwaway insert within a holder recess where the throwaway insert is provided with a pin receiving hole. The invention is directed to a holder which employs a throwaway insert of ordinary configuration having a cylindrical pin receiving hole and a plurality of side surfaces which are perpendicular to the top and bottom surfaces of the insert. The holder has a recess which includes a base surface of nearly the same shape as that of the insert and two restricting surfaces serving as recessed side walls and is provided with a rotatable pin which rotates eccentrically with respect to the cylindrical hole carried by the throwaway insert allowing the insert to be clamped to the holder by rotating the pin eccentrically.

The present invention provides such advantages as being inexpensive in manufacture by employing an eccentrically mounted coupling shaft, having high coupling strength by employing two restricting surfaces for accurately locating the insert with respect to the holder recess, and being readily adaptable since it may be used with a conventional insert carrying a cylindrical hole.

BRIEF DESCRIPTION OF THE DRAWINGS

FIG. 1 is a perspective view of an insert to be coupled by means of the present invention to the holder of FIG. 2.

FIG. 2 is a perspective view of a portion of a holder for receiving the insert of FIG. 1.

FIG. 3 is a perspective view of a pin for use in coupling the throwaway insert of FIG. 1 within the recess of the holder of FIG. 2.

FIG. 4A is a schematic view of a coupled insert and holder under one set of operating conditions.

FIG. 4B is a schematic representation of the coupled elements under a second set of conditions.

FIG. 4C is a schematic representation of the coupled element of FIG. 4A.

FIG. 5A is a pictorial representation of the relationship of the element forming the insert coupling of the present invention.

FIG. 5B is a pictorial representation of the relationship of the insert with respect to certain parameters of the recessed holder receiving the same under a given set of conditions.

FIG. 5C is a plan view of an eccentric mounting pin employed in the coupling technique of the present invention under a given set of conditions.

FIG. 5D is a side elevational view of a portion of the pin shown in FIG. 5C.

FIG. 9 is a plan schematic view of the clamped elements showing their interrelationship.

FIG. 10 is a plot of the octagonal region of the coupled elements of FIG. 9.

DESCRIPTION OF THE PREFERRED EMBODIMENT

Figure 6:
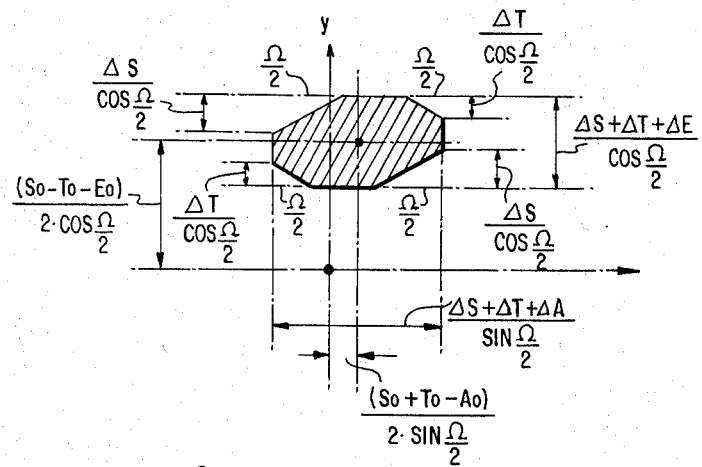
FIG. 6 is a sectional view of an insert of theoretically desirable configuration.

Referring to FIGS. 1, 2 and 3 of the drawing an insert 1 to be clamped within a configured recess formed by a base surface 3 and inclined restricting side surfaces 4 and 5 carries a vertically oriented, cylindrical through hole 10. The insert is provided with flat top and bottom surfaces, and a plurality of side surfaces so as to form an outer periphery in the shape of a polygon. At least a portion or all of the bottom surface of the insert is planar. The configuration of the recess carried by recessed holder 2 is in this example, complementary to that of the throwaway insert 1. The restricting surfaces 4 and 5 are equal to the corner angle of the insert and receives the same, and the recessed holder carries a vertical cylindrical hole 6 which is also perpendicular to the base surface 3. The pin of FIG. 3 which is to be inserted within the cylindrical hole 6 formed in the holder 2, is provided with a column portion 7 having an outer diameter substantially identical to that of the cylindrical hole 6. On one side of the column portion 7 having an outer diameter substantially identical to that of the cylindrical hole. To one side of the column portion 7 there is formed a second eccentric column portion 8 having an axis eccentric to and parallel to the axis of the column portion 7. On the opposite side of the column 7 from column 8 there is provided a section in the form of a prism for rotating the pin within its receiving recess 6.

In attaching the insert 1 to the recess holder 2, column portion 7 of the pin is inserted into the cylindrical hole 6 of the holder 2 in such a manner that only the eccentric head portion or column portion 8 protrudes above the base surface 3 and is received within the cylindrical hole 10 within insert 1 once the insert is seated within the recess of holder 2. After seating of the insert within the recess and with the pin in position, the pin is rotated within supporting hole 6 by rotating the prism portion 9 in a predetermined direction. The eccentric pin portion 8 moves into contact, with the contact point being positioned within a certain angular ring which depends on the involved angle between the two restricting surfaces 4 and 5 so as to press the insert closely against the two restricting surfaces of the holder.

In this device, the column portion 7 of the pin and the eccentric portion 8 are not limited to a cylindrical columnar shape but may be of any shape provided that they are rotating columnar shapes having relatively small gap and fitting within the cylindrical hole 6. There may be for instance threaded engagement between section 7 of the pin and its receiving opening 6.

The method of eccentric positioning of the insert with respect to the recessed hole is described by reference to the additional figures of the drawing.

Turning to FIGS. 4A, B and C, point $O_1$ defines the center line of the pin section 7 with respect to the axis of hole 6 receiving the pin section 7, the point $O_2$ defines the center line of the pin eccentric portion 8 and the point $O_3$ is the center line of the hole carried by the insert 1. The point P defines the line of contact between the section 8 and the hole pin which receives the same. The arrow F defines the direction of rotation of the eccentric pin tending to fix the insert with respect to receiving recess.

FIG. 4A shows the positions at each point of the insert in a clamped state for an eccentric pin, single surface restriction type of coupling. Neglecting friction at point P, each of the points P, $O_2$ and $O_3$ are disposed in a straight line, perpendicular to the plane $R_1$, in this order. The position of point $O_1$ is to the left side of this straight line.

Considering that one oblique side of the insert (an oblique side at the left side in FIG. 4A) may be restricted by the second restricting surface $R_2$, it is obviously impossible to position any further to the left side for instance straight line W—W and the position of the oblique side $R_2$ shown in FIG. 4A. Since the eccentric shaft cannot rotate in the direction of arrow F further than the position shown in FIG. 4A, the insert cannot be moved further to the left than the position shown. Contrary to this, such dual restrictions may be possible when the second restricting surface $R_2$ is placed along the defined straight line V—V in which case, reference to FIG. 4B shows the position of each of the points in its clamped state.

As the distance $\epsilon$ is enlarged, the angles formed by points O1, O2 and O3 becomes great and a certain value of $\epsilon$, the angle between points O1, O2 and O3 becomes 180° as seen in FIG. 4C.

In FIGS. 4A, 4B and 4C, the dimensions $a$, $B_1$ and $O_1$, $O_2$, $O_3$ are considered constant and only a variation in the distance $\epsilon$ is being considered. In this condition, the eccentric pin is difficult to rotate at all, that is the mounting and attaching of the insert in fixed position by rotation of the eccentric pin is impossible. By making $\epsilon$ greater, the insertion itself of the insert becomes impossible.

On the other hand, by the above analysis, when $a$, $B_1$, O1, O2 and O3, $O_1$, $O_2$, $O_2$ and $O_3$ are given and if the distance $c$ (FIG. 4A) between the second restricting surface and the point $O_1$ is within certain limits as determined from above, multiple surface restriction may be practiced.

The factor most affecting the breadth of these limits is the relationship between $O_2$ and $O_3$. The shorter the distance between $O_2$ and $O_3$, the narrower the limit becomes, and when this distance reaches zero, two-surface restriction occurs only when $\epsilon$ is equal to zero, and furthermore in this condition the insert is in a clamped state which is inoperable, the state being shown in FIG. 4C.

The above explanation is made purely on the assumption that only $\epsilon$ is varied. However, in practice, $a$, $b_1$, $b_2$, $c$, the distance between $O_1$ and $O_2$ and the distance between $O_2$ and $O_3$ may change due to manufacturing errors of the insert holder and the eccentric pin for mounting the insert within the holder. Also, in order that two-surface insert restriction may be practiced, the six element relationship of $a$, $b_1$, $b_2$, $c$ and $O_1O_2$ must be within predetermined limits.

In an eccentric pin, single surface restriction type of insert locating mechanism, the condition controlling the operation involves a four element relationship consisting of points $O_1O_2$, $O_2O_3$, $a$ and $b_1$. Moreover, since the points are $O_2$, $O_3$ and P may be considered to be on one straight line perpendicular to the restricting plane, a simplified analysis is sufficient. More important is the fact that, it is almost always desirable to make the diameter of the head portion 8 of the eccentric pin as small as possible so as to allow it to be inserted within the hole of the insert, that is, mainly to select the distance between points $O_2$ and $O_3$ to be as small as possible, however, this leads to a false conception that it is impossible to realize two-surface restriction using a simple eccentric pin-type connection. For the present invention, however, the possibility is realized by the analysis of the six element relationship suggested from FIG. 4B.

The present invention allows the above described mechanism to be possible, namely, on the grounds as mentioned above:

(a) To increase the possibility of achieving two-surface restriction by considering restriction of the length of the distance from $O_2$ and $O_3$ (that is by selecting the outer diameter of the head portion 8 of the eccentric pin to be considerably smaller than the diameter of the insert hole 10).

(b) Then, analyzing completely the conditions to be satisfied by the six element relationship and clarify the design data of each of the dimensions.

The following constitutes an explanation of this relationship. In the following analysis, it is assumed that the direction of clamping by the eccentric pin is as shown in FIG. 5B. If the direction of clamping is opposite thereto, then the following representation will be in image relationship.

In FIG. 5, the designations with the suffix 0 and the prefix $\Delta$ represent the central value of the design and one-half of the extent of allowable tolerance, respectively of these dimensions. Errors in the angle $\Omega$ is neglected.

Denoting the distance from $O_2$ to $O_3$ (FIG. 4B) it is seen that the fixed state of the insert by $P_0 \pm \Delta P$ $$O_2O_3 = P_0 \pm \Delta P = \tfrac{1}{2}[D_0 \pm \Delta D - (d_0 \pm d)]$$
$$= \frac{D_0 + d_0}{2} \pm \frac{\Delta D + \Delta d}{2}$$

namely $$P_0 = \frac{D_0 - d_0}{2}$$
$$\Delta P = \frac{\Delta D + \Delta d}{2}$$

Further, putting $$A_0 = b_{10} + b_{20}$$
$$\Delta A = \Delta b_1 + \Delta b_2$$
$$E_0 = \frac{b_{10} - b_{20}}{2}$$

The shape of the insert is an equilateral polygon or rhomb in most cases, wherein $A_0$ represents the reference value of the diameter of the inscribed circle, and $\Delta A$ one half of the extent of the allowable difference, and $E_0 = 0$.

In general, the absolute value of the difference between $b_{20} \pm \Delta b_2$ and $b_{10} \pm \Delta b_1$ is so restricted that it is limited within a certain allowable extent. The extent of allowable difference is shown by $\Delta E$.

Now, the first step to be considered is to determine each of the dimensions which relate only to the insert, namely $D_0$, $\Delta D$, and $b_{10}$, $b_{20}$, $b_1$, $b_2$ and therefore, $A_0$, $\Delta A$, $E_0$ and $\Delta E$, and the angle $\Omega$. If the standard specification is provided, these dimensions are previously given.

Next, values concerning the eccentric pin, that is, $e_0$, $\Delta e$, $d_0$ and $\Delta d$ and therefore $P_0$, and $\Delta P$ are determined. $\Delta e$, and $\Delta d$ should be determined in considering the possible accuracy due to the manufacture.

It will be preferable to select $d_0$ as being 80 to 90% value of $D_0$. If $d_0$ is too small, it weakens the strength of the eccentric pin, while if it is too large, the possible range of two-surface restriction becomes narrow. A value of about 85% is preferable.

Then $e_0$ may be selected as follows:

$$e_0 + \Delta e = d_0 \times (0.12 \sim 0.24)$$

Usually, it is preferable to select the value in the parentheses as 0.15 to 0.18. If this value is too large, the frictional resistance between the insert and the eccentric pin at the fixed or restricted position of the insert becomes small, so that the insert is liable to be loosened after being fixedly coupled within the recessed holder. On the contrary, if the value is too small, an excessive restraining force is induced to such an extent that there may be danger of producing plastic deformation of the eccentric pin.

As the values concerning the holder, that is those for $\Delta S$, $\Delta T$ are predetermined it should be remembered that the values may change slightly depending upon the accuracy in the manufacture of the holder.

Then, the range occupied by the relationship between point $O_1$ and point $O_3$ of the frictionally coupled provision of the insert is calculated. This relationship is shown in FIG. 6. Here in this coordinate axis, the origin is the point $O_3$, the $x$-axis is in a direction parallel to the bisector of the angle $\Omega$ formed by the two planes of the surface restrictions and is in a direction outwardly of the insert seat with the $y$-axis being in a direction normal to the $x$-axis in a clockwise fashion.

Since $S_0$, $T_0$ are not yet determined, the calculation of these parameters is limited only to the size and shape and their positional relation to the coordinate axis is not yet established. In general, since $\Delta S$ and $\Delta T$ are selected as being equal (because the conditions for the manufacture of the restriction surface are the same both for $\Delta S$ and $\Delta T$), this region becomes an octagon with its sides parallel to the $x$ and $y$-axes, respectively.

Figure 7:
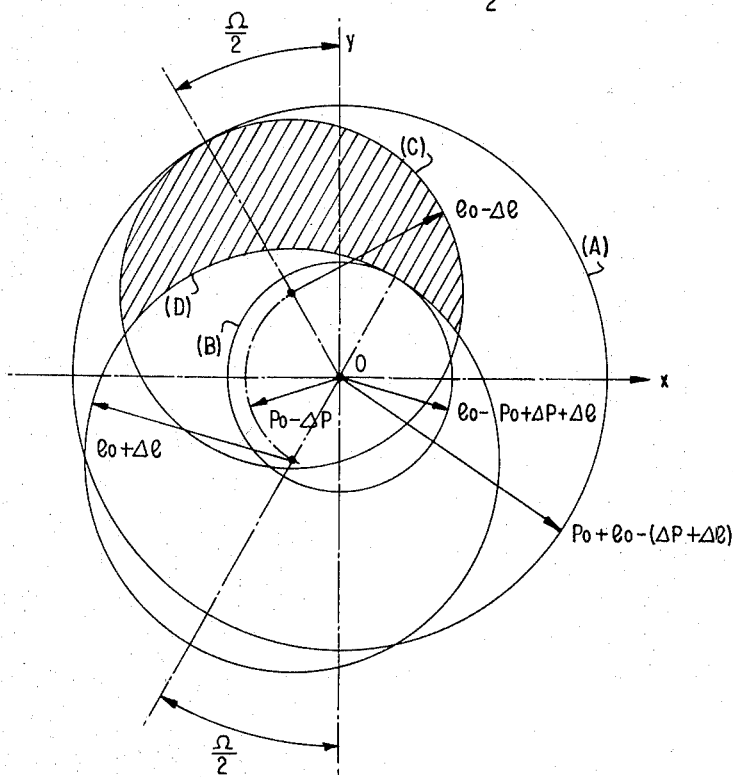
FIG. 7 is a plot of the attachment phase characteristic diagram prepared from the allowable variation in the positional relationship of the parts forming coupling of the present invention.

Thus prepared, a frictional attachment or fixing phase characteristic diagram may be drawn as shown in FIG. 7. The coordinate axis of this characteristic diagram is the same as in FIG. 6. The diagram comprises two circles (A), (B), each having its center at a common point of origin and two circles (C), and (D) each having center points other than the origin. The radii for each circle and the central position of the circles (C), (D) are all shown in the diagram.

Figure 8A:
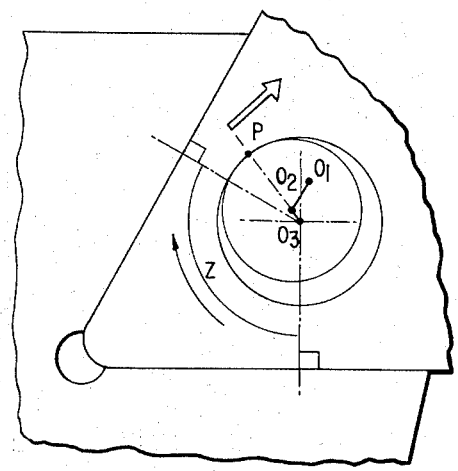
FIG. 8A is a schematic representation of the relationship between the insert, the recessed holder and the eccentric pin of the present invention under a given set of circumstances.
Figure 8B:
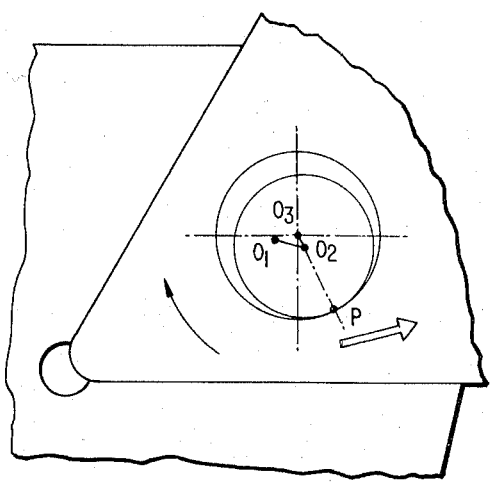
FIG. 8B is a schematic representation of the elements of FIG. 8A under a second set of circumstances.

If the point $O_1$ is located in the region shown as being cross hatched in this diagram, two-surface restriction for the insert can be realized. The two circles (A) and (B) do not serve to form this region, but they may be defined as absolute boundaries, which means that two-surface restriction becomes entirely impossible for full or partial combination region of an eccentricity value ($O_1O_2$) and a gap amount ($2 \times O_2O_3$), if point $O_1$ is situated outside the circle (A) or inside the circle (B). When point $O_1$ is situated between the two circles (A) and (B), two-surface restriction is insured, but there may also exist a situation of uselessness insofar as the essential clamping mechanism is concerned. These are the states shown in FIGS. 8A, and 8B, for example, and in these cases, the insert can be moved in the direction shown by the arrows so that the insert is not clamped within its recesses and these conditions are not satisfactory. The appropriate clamping condition exists when the contact point P of the hole and the eccentric pin come between perpendiculars drawn from the two restricting surfaces to point $O_3$, respectively (as shown by arrows Z in FIG. 8A).

Figure 8C:
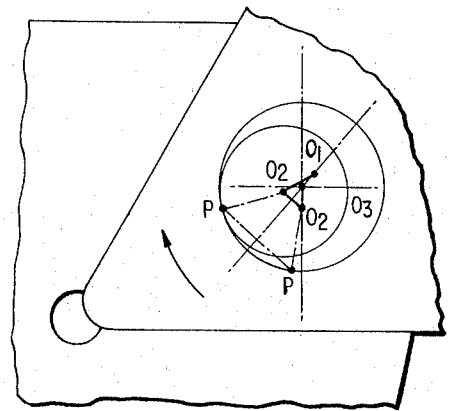
FIG. 8C is a schematic representation of the elements of FIG. 8A under a third set of circumstances.
Figure 8D:
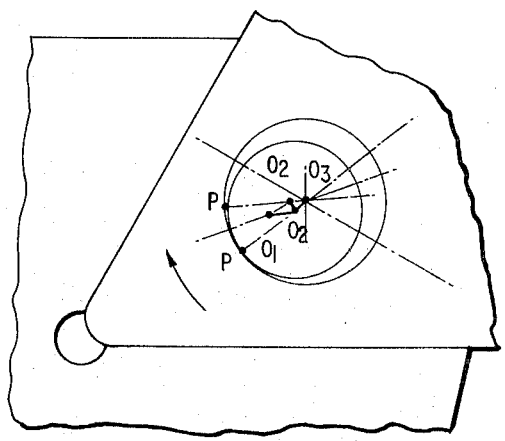
FIG. 8D is a schematic representation of the elements of FIG. 8A under yet a fourth set of circumstances.

In some cases, two-surface restriction may again occur when the insert is loosened (that is, by rotating eccentric pin in the opposite direction) even when the above-stated conditions are satisfied. This state is illustrated in FIGS. 8C and FIGS. 8D. P and $O_2$ show respectively, the positions of the contact point and the center of the eccentric pin in this clamping state. During insert loosening, reclamping occurs at position P′ (contact point) and $O_2'$ (center of the eccentric pan), each being symmetrical points for P and $O_2$ with relation to the straight line $O_1O_3$. The possible rotary movement of the eccentric pin is given by the angle $O_2O_1O_2'$. Thus, in this case conditions for clamping and unclamping of the insert within its recess become inconvenient and this relationship is not appropriate.

If the point $O_1$ falls within the cross-hatched region of FIG. 7, no inconvenience will be produced for all combinations of eccentricity, and the amount of gap which may occur due to predetermined manufacturing tolerances.

Since the position of point $O_1$ in the characteristic curve given has a variable region as shown in FIG. 6 according to the allowable tolerance in the manufacture of the insert and the holder, when both diagrams are superimposed and if the octagonal region of FIG. 6 falls completely in the hatched region of FIG. 7, an appropriate two-surface restriction is insured for all combinations of dimensions of the elements (of course, assuming that they fall within their allowable tolerance). It is to be noted that in superpositioning both of the diagrams, they may be allowed to shift parallel to each other, but rotation is not allowed.

In case the octagonal region cannot be brought into the hatched area by parallel shifting, it is apparent that some of the design values are inappropriate. It is therefore necessary to repeat the above operation in changing the proper values until by shifting, the octagonal region may be brought into the hatched area successfully. In case where the source of the failure lies in any of; $\Delta S$, $\Delta T$, $\Delta A$, $\Delta E$, $\Delta P$, and $\Delta e$, and where it is impossible to correct them due to some reason such as by accuracy of the manufacture of the same, the two-surface restriction according to the present invention may not be assured for all cases and this thus becomes a technical limit in practicing the present invention.

When the overlapping of the octagonal region with respect to the hatch area is achieved with considerable margin, the manner of placing the octagonal region becomes free. In this case it is preferable as the center of the octagonal region approaches the y-axis and the periphery of the octagonal region is positioned rather remote from the circumference (C) and near to (but not too near) the circumference (D). As a result thereof:

(1) The frictional force at the contact portion of the eccentric pin and the hole of the insert is increased, and moreover, a relatively stable frictional force is presented for variation within the allowable tolerance of dimensions of the various elements. That is to say, the clamping of the insert to the recessed hole is achieved with greater strength and increased stability.

(2) For variation within the allowable differences in dimensions of the various elements, contact point P (refer to FIG. 4B) is readily positioned near to the restricting surface $R_1$ than to the restricting surface $R_2$. This means a safer and more reliable clamping of the insert.

In this way, when the positioning of the octagonal region is determined, the x- and y-coordinates at the center of the figure are fixed. Denoting these by $x_0$ and $y_0$ respectively, $S_0$ and $T_0$ which were not determined are now fixed also.

$$S_0 = b_{10} + x_0 \sin\frac{\Omega}{2} + y_0 \cos\frac{\Omega}{2}$$

$$T_0 = b_{20} + x_0 \sin\frac{\Omega}{2} - y_0 \cos\frac{\Omega}{2}$$

By these determinations, the setting and assurance of values which enable the realization of two-surface restriction for any possible combination is completed with respect to the dimensions and tolerances in dimensions for each of the elements of the mechanism.

In order to know specifically, how and to what extent the variations of phase of each of the points $O_1$, $O_2$, $O_3$ and P at the clamped state of the insert, an analysis may be achieved by using analytical geometry and differential calculus. The design of the mechanism according to the present invention and the calculated data which follows such analysis are provided in Tables 1 and 2.

TABLE 1

Throwaway insert

Shape: Equilateral triangle

| | |
|---|---|
| $\Omega$ | 60° |
| $A_0$ mm | 12.7 |
| $\Delta A$ mm | 0.15 |
| $E_0$ | 0 |
| $\Delta E$ mm | 0.05 |
| $D_0$ mm | 5.2 |
| $\Delta D$ mm | 0.10 |

Holder:

| | |
|---|---|
| $\Delta T$ mm | 0.03 |
| $\Delta S$ mm | 0.03 |

Eccentric pin:

| | |
|---|---|
| $d_0$ mm | 4.5 |
| $\Delta d$ mm | 0.05 |
| $e_0$ mm | 0.60 |
| $\Delta e$ mm | 0.05 |

Central coordinate of octagonal region:

| | |
|---|---|
| $x_0$ mm | 0.08 |
| $Y_0$ mm | 0.52 |
| $S_0$ mm | 6.760 |
| $T_0$ mm | 5.860 |

TABLE 2.—PHASES AT CENTER AND EXTREMITY (FOR EACH NOTATION, REFER TO FIG. 9)

| Phase | Notation of Position | P, mm. | e, mm. | $\varphi°$ | $\theta°$ | $\lambda°$ | $\lambda°$ |
|---|---|---|---|---|---|---|---|
| Number: | | | | | | | |
| 0 Central phase | M | .350 | .600 | 92.62 | −26.70 | 119.33 | 11.62 |
| 1 Phase where $\varphi$ is maximum | Between A and B | .275 | .650 | 134.72 | 0.00 | 134.72 | 9.68 |
| 2 Phase where $\varphi$ is minimum | D | .425 | .550 | 52.51 | −58.15 | 110.66 | 11.89 |
| 3 Phase where $\theta$ is maximum | H | .275 | .650 | 124.50 | 5.59 | 118.91 | 12.51 |
| 4 Phase where $\theta$ is minimum | B | .425 | .550 | 56.78 | −61.99 | 118.77 | 10.85 |
| 5 Phase where $\gamma$ is maximum | B′ | .275 | .650 | 123.48 | −20.66 | 144.14 | 7.81 |
| 6 Phase where $\gamma$ is minimum | F | .275 | .550 | 82.65 | −4.46 | 87.11 | 13.88 |
| 7 Phase where $\lambda$ is maximum | F | .275 | .619 | | | | 14.38 |
| 8 Phase where $\lambda$ is minimum | B′ | .275 | .650 | | | | 7.81 |

It is to be noted, that the essential point of the present invention is that two side-surfaces of the insert are pressed against two restricting surfaces of the holder and in accordance with the present invention, the outer diameter of the head portion of the eccentric pin is designed considerably smaller than the diameter of the insert hole. That is, by selecting the outer diameter of the head portion of the eccentric pin as being on the order of 80 to 90% of the hole diameter within the insert, the possibility of realizing two-surface restriction is greatly increased.

While the invention has been particularly shown and described with reference to a preferred embodiment, it will be understood by those skilled in the art that the foregoing and other changes in form and details may be made therein without departing from the spirit and scope of the invention.

I claim:

1. In an insert holder which holds on insert frictionally clamped thereto by a pin extending therebetween and wherein the holder comprises a base surface for receiving the insert and seating portion consisting of two surfaces forming an included angle equal to the corner angle of the insert carried thereby, and wherein the holder body is provided with a cylindrical hole perpendicular to the base surface and the insert is provided with a cylindrical hole perpendicular to its base surface, the improvement comprising a pin having a first portion carried by a said cylindrical hole in said holder, and a second portion carried by said cylindrical hole insert, said holder pin portion being rotatable within said holder cylindrical hole about a common hole axis, said second insert pin portion having an axis parallel with and eccentric to said holder portion, the diameter of said second insert pin portion being less than the diameter of said insert pin receiving hole and the dimensions and relationship between said pin and the holes carried respectively by said recessed holder and said insert being such that, by rotating said pin in a predetermined direction about the axis of said recessed holder hole, the two side surfaces of said insert are clamped against the insert holding surfaces of the holder body simultaneously to insure clamping of said insert to said holder in a single position of maximum restraint.

2. The holder and insert clamping arrangement as claimed in claim 1 wherein the diameter of the hole carried by said insert is considerably larger than the diameter of the insert portion of the pin and within the range defined by octagonal region analysis to insure multiple surface clamping restriction subsequent to eccentric clamping regardless of manufacturing tolerances to the pin, the insert, and the holder receiving the same.

References Cited

UNITED STATES PATENTS 3,377,685  4/1968  Carlstedt _____ 29—200

THOMAS H. EAGER, Primary Examiner

UNITED STATES PATENT OFFICE
CERTIFICATE OF CORRECTION

Patent No. 3,555,647          Dated  Jan. 19, 1971

Inventor(s) Yasuo Ohtsu,

It is certified that error appears in the above-identified patent and that said Letters Patent are hereby corrected as shown below:

Column 1, line 9, change [42/59,507] to ---- 42/59,506 ----.

Signed and sealed this 12th day of December 1972.

(SEAL)
Attest:

EDWARD M. FLETCHER, JR.
Attesting Officer

ROBERT GOTTSCHALK
Commissioner of Pate